US008862852B2

(12) United States Patent
Kern (10) Patent No.: US 8,862,852 B2
(45) Date of Patent: Oct. 14, 2014

(54) APPARATUS AND METHOD TO SELECTIVELY PROVIDE INFORMATION TO ONE OR MORE COMPUTING DEVICES

(75) Inventor: Robert F. Kern, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1300 days.

(21) Appl. No.: 11/050,272

(22) Filed: Feb. 3, 2005

(65) Prior Publication Data

US 2006/0174080 A1   Aug. 3, 2006

(51) Int. Cl.
   *G06F 12/00*   (2006.01)
   *G06F 17/30*   (2006.01)
   *G06F 3/06*    (2006.01)

(52) U.S. Cl.
   CPC ............ *G06F 17/302* (2013.01); *G06F 3/0605* (2013.01); *G06F 3/067* (2013.01); *G06F 3/0647* (2013.01)
   USPC ........... 711/170; 711/161; 711/162; 711/173; 726/26; 726/27; 726/28; 726/29; 726/30

(58) Field of Classification Search
   USPC ........................................................ 711/173
   See application file for complete search history.

(56) References Cited

U.S. PATENT DOCUMENTS

| | | | |
|---|---|---|---|
| 5,787,437 A | 7/1998 | Potterveld et al. | |
| 6,115,711 A | 9/2000 | White | |
| 6,377,934 B1 | 4/2002 | Chen et al. | |
| 6,389,432 B1* | 5/2002 | Pothapragada et al. | 707/205 |
| 6,654,830 B1 | 11/2003 | Taylor et al. | |
| 6,668,253 B1 | 12/2003 | Thompson et al. | |
| 6,714,980 B1* | 3/2004 | Markson et al. | 709/226 |
| 6,742,020 B1 | 5/2004 | Dimitroff et al. | |
| 7,007,048 B1* | 2/2006 | Murray et al. | 707/204 |
| 7,082,548 B2* | 7/2006 | Nakano | 714/6 |
| 7,120,827 B2* | 10/2006 | Fujibayashi | 714/7 |
| 7,124,258 B2* | 10/2006 | Nakayama et al. | 711/154 |
| 7,185,192 B1* | 2/2007 | Kahn | 713/155 |
| 2003/0158869 A1* | 8/2003 | Micka | 707/203 |
| 2003/0172157 A1* | 9/2003 | Wright et al. | 709/225 |
| 2004/0006585 A1 | 1/2004 | Paulus et al. | |
| 2004/0064456 A1 | 4/2004 | Fong et al. | |
| 2005/0055603 A1* | 3/2005 | Soran et al. | 714/7 |
| 2005/0193038 A1* | 9/2005 | Pearson et al. | 707/203 |

OTHER PUBLICATIONS

Weisstein, Eric W. "Subset." From MathWorld—A Wolfram Web Resource. http://mathworld.wolfram.com/Subset.html.*

(Continued)

*Primary Examiner* — Matthew Bradley
*Assistant Examiner* — Alan Otto
(74) *Attorney, Agent, or Firm* — Dale F. Regelman; Quarles & Brady LLP (57) ABSTRACT

A method is disclosed to selectively provide information to one or more remote computing devices. The method provides an information storage and retrieval system comprising first information, a first logical partition, and a second logical partition, where the first information is disposed in the first logical partition. The method further provides a data extraction algorithm, forms second information comprising an instantaneous point-in-time copy of the first information, and forms third information from the second information using the data extraction algorithm. The method then migrates the third information from the first logical partition to the second logical partition, and provides access rights to that third information to one or more computing devices capable of communicating with the information storage and retrieval system.

31 Claims, 10 Drawing Sheets

(56) References Cited

OTHER PUBLICATIONS

Weisstein, Eric W. "Improper Subset." From MathWorld—A Wolfram Web Resource. http://mathworld.wolfram.com/ImproperSubset.html.*

IBM, "IBM TotalStorage Enterprise Storage Server: Implementing ESS Copy Services with IBM eServer zSeries", Redbooks, SG24-5680-05, Sep. 2003, Chapters 6 and 7.

* cited by examiner

APPARATUS AND METHOD TO SELECTIVELY PROVIDE INFORMATION TO ONE OR MORE COMPUTING DEVICES

FIELD OF THE INVENTION

The invention relates to an apparatus and method to selectively provide information to one or more computing devices.

BACKGROUND OF THE INVENTION

In hierarchical computer storage systems, fast and intensively used storage are paired with arrays of slower and less frequently accessed data devices. One example of high-speed, expensive memory is a direct access storage device file buffer (DASD). Slower storage devices include tape drives and disk drive arrays. Such tape drives and/or disk drive arrays are often located in an information storage and retrieval system, sometimes referred to as an automated media storage library.

Information storage and retrieval systems are known for providing cost effective access to large quantities of stored information, such as backup computer files. Generally, such information storage and retrieval systems include information storage media, such as a plurality of tape cartridges, a plurality of optical cartridges, a plurality of disk arrays, a plurality of electronic storage media, and the like. By electronic storage media, Applicants mean a device such as a PROM, EPROM, EEPROM, Flash PROM, and the like. A number of different companies manufacture automated media storage libraries today, each model displaying various different features. One example is the IBM TotalStorage® Enterprise Storage Server.

Storage area networks (SANs) are dedicated networks that connect one or more host computers with one or more or servers, i.e. computing device, and with one or more information storage and retrieval systems. SANs may utilize an appliance, such as a networked attached storage device ("NASD") to manage the SAN.

What is needed is a method to selectively provide information received by an information storage and retrieval system from one or more host computers to one or more remote computing devices.

SUMMARY OF THE INVENTION

Applicants' invention includes an apparatus and method to selectively provide information to one or more remote computing devices. The method provides an information storage and retrieval system comprising first information, a first logical partition, and a second logical partition, where the first information is disposed in the first logical partition.

The method further provides a data extraction algorithm, forms second information comprising an instantaneous point-in-time copy of the first information, and forms third information from the second information using the data extraction algorithm. The method then migrates the third information from the first logical partition to the second logical partition, and provides access rights to that third information to one or more computing devices capable of communicating with the information storage and retrieval system.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the Figures. The invention will be described as embodied in a data processing system which includes one or more host computers, one or more information storage and retrieval systems, and one or more remote computing devices.

In certain embodiments, Applicants' information storage and retrieval system 100 includes a plurality of host adapters 102-105, 107-110, 112-115, and 117-120, disposed in four host bays 101, 106, 111, and 116. In other embodiments, Applicants' information storage and retrieval system includes fewer than 16 host adapters. In the illustrated embodiment of FIG. 1, host computer 390 is interconnected with host adapter 102 via communication link 395.

Figure 1:
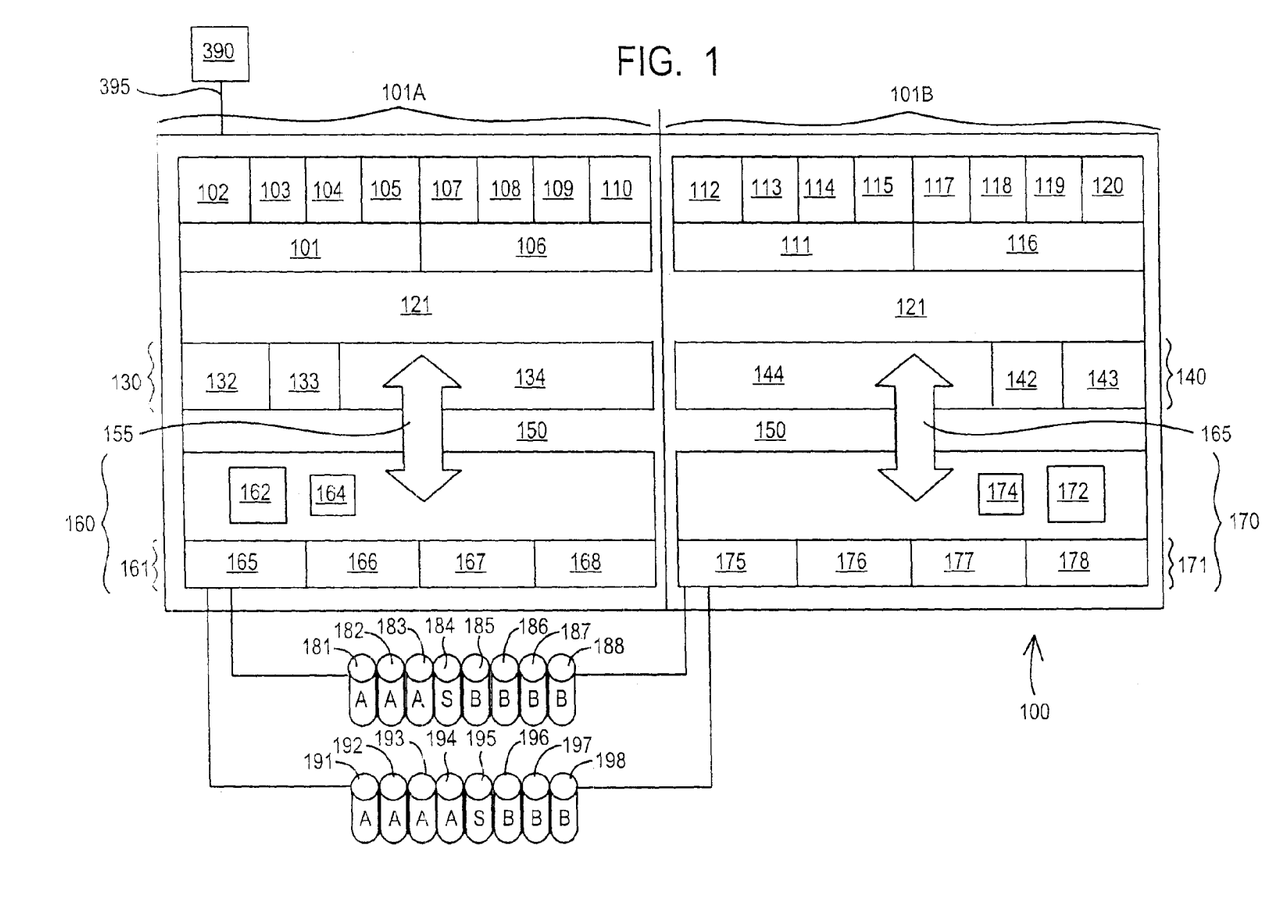
FIG. 1 is a block diagram showing the components of one embodiment of Applicants' information storage and retrieval system.

Regardless of the number of host adapters disposed in any embodiments of Applicants' system, each of those host adapters comprises a shared resource that has equal access to both central processing/cache elements 130 and 140. Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicants' system, one or more host adapters, processor portion 130, and one or more device adapters, are packaged together on a single card disposed in Applicants' information storage and retrieval system. Similarly, in certain embodiments, one or more host adapters, processor portion 160, and one or more device adapters, are disposed on another card disposed in Applicants' information storage and retrieval system. In these embodiments, Applicants' system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicants' information storage and retrieval system includes more than two storage device arrays. Each storage array appears to a host computer as one or more logical devices.

In certain embodiments, one or more of the data storage devices comprise a plurality of hard disk drive units. In the illustrated embodiment of FIG. 1, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, Applicants' system includes a single storage device array. In yet other embodiments, Applicants' system includes more than two storage device arrays.

Figure 2A:
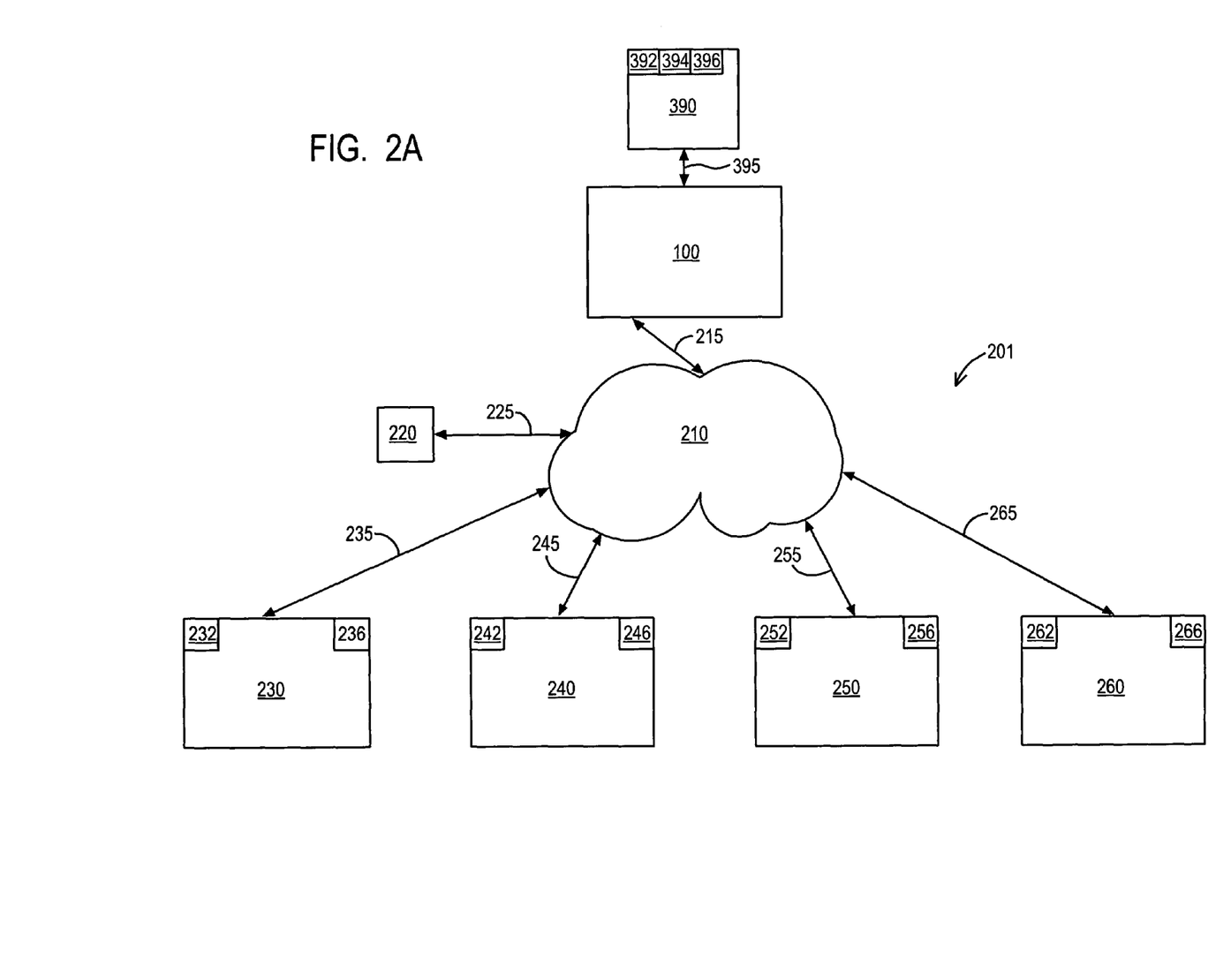
FIG. 2A is a block diagram of one embodiment of Applicants' data processing system.

FIG. 2A shows one embodiment of Applicants' data processing system, namely system 201. Data processing system 201 includes host computer 390, information storage and retrieval system 100 which is capable of communicating with host computer 390 via communication link 395, storage attached network ("SAN") 210 which is capable of communicating with information storage and retrieval system 100 via communication link 215, network attached storage device ("NASD") 220 which is capable of communicating with SAN 210 via communication link 225, computing device 230 which includes operating system 232 and which is capable of communicating with SAN 210 via communication link 235, computing device 240 which includes operating system 242 and which is capable of communicating with SAN 210 via communication link 245, computing device 250 which includes operating system 252 and which is capable of communicating with SAN 210 via communication link 255, and computing device 260 which includes operating system 262 and which is capable of communicating with SAN 210 via communication link 265.

In the illustrated embodiment of FIG. 2A, computing device 230 is capable of communicating with SAN 210 via communication link 235, computing device 240 is capable of communicating with SAN 210 via communication link 245, computing device 250 is capable of communicating with SAN 210 via communication link 255, and computing device 260 is capable of communicating with SAN 210 via communication link 265.

Host computer 390 comprises a computer system, such as a mainframe, personal computer, workstation, and combinations thereof, including an operating system 392 such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program 394. Storage management program 394 disposed in host computer 390 may include the functionality of storage management type programs known in the art that manage the transfer of data to a data storage and retrieval system, such as the IBM DFSMS storage management program implemented in the IBM MVS operating system. In certain embodiments, host computer 390 further includes database 396.

The illustrated embodiment of FIG. 2A shows a single host computer. In other embodiments, Applicants' data processing system includes a plurality of host computers. The illustrated embodiment of FIG. 2A shows four computing devices capable of communicating with SAN 210. In other embodiments, Applicants' data processing system includes fewer than four computing devices capable of communicating with SAN 210. In still other embodiments, Applicants' data processing system includes more than four computing devices capable of communicating with SAN 210.

NASD 220 comprises storage elements or devices that connect to a network and provide file access services to, for example, computing devices 230, 240, 250, and 260. NASD 420 attaches directly to networks, such as local area networks, using traditional protocols such as Ethernet and TCP/IP, and serve files to one or more clients, such as for example projector 100, connected to the network. In certain embodiments, NASD 420 includes an engine, which implements the file access services. A client that accesses a NASD typically uses a file system device driver to access the stored data. The file system device driver typically implements file access commands. The file system driver disposed in a NASD interprets these commands and performs the internal device input/output (I/O) operations necessary to execute those file access commands.

Communications links 215, 225, 235, 245, 255, 265, and 395, are each individually selected from the group which includes a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, one or more of communication links 215, 225, 235, 245, 255, 265, and 395 are compliant with one or more of the embodiments of IEEE Specification 802.11 (collectively the "IEEE Specification"). As those skilled in the art will appreciate, the IEEE Specification comprises a family of specifications developed by the IEEE for wireless LAN technology.

Computing device 230 includes operating system 232 and database 236, wherein operating system 232 may be the same or may differ from operating system 392, and wherein database 236 may be accessible using the same software, or may be accessible using different software, than database 396. Computing device 240 includes operating system 242 and database 246, wherein operating system 242 may be the same or may differ from one or more of operating systems 392 and 232, and wherein database 246 may be accessible using the same software, or may be accessible using different software, than one or more of databases 236 and 396. Computing device 250 includes operating system 252 and database 256, wherein operating system 252 may be the same or may differ from one or more of operating systems 232, 242, and 392, and wherein database 256 may be accessible using the same software, or may be accessible using different software, than one or more of databases 236, 246, and 396. Computing device 260 includes operating system 262 and database 266, wherein operating system 262 may be the same or may differ from one or more of operating systems 232, 242, 252, and 392, and wherein database 266 may be accessible using the same software, or may be accessible using different software, than one or more of databases 236, 246, 256, and 396.

In certain embodiments, a storage services provider owns and/or operates information storage and retrieval system 100 and SAN 210. The one or more host computers, such as for example host computer 390, are owned and/or operated by one or more storage services customers of that storage services provider. In certain embodiments, computing devices 230, 240, 250, and 260, are also owned by one or more storage services customers of the storage services provider.

For example in certain embodiments, a customer of the storage services provider owns host computer 390 and computing devices 230, 240, 250, and 260. These computing devices may be used by, for example, different departments/divisions of the customer, including for example the customer's personnel department, the customer's manufacturing division, the customer's sales division, and the customer's finance department. The customer may not want each of its various departments/divisions to have access to all the data provided to information storage and retrieval system 100 by host computer 390. Rather, the storage services customer, using customer defined data access protocols, determines which information each of its various departments/divisions, using computing devices 230, 240, 250, and/or 260, may access.

In other embodiments for example, the one or more host computers are owned by a storage services customer, such as a financial institution. Computing devices 230, 240, 250, and 260, are owned by various business partners of that financial institution. The financial institution may not want each of its business partners to have access to all the data provided to information storage and retrieval system 100 by host computer 390. Rather, the financial institution, i.e. the storage services customer, using customer defined data access protocols, determines which information each of its various business partners may access using computing devices 230, 240, 250, and/or 260.

Figure 2B:
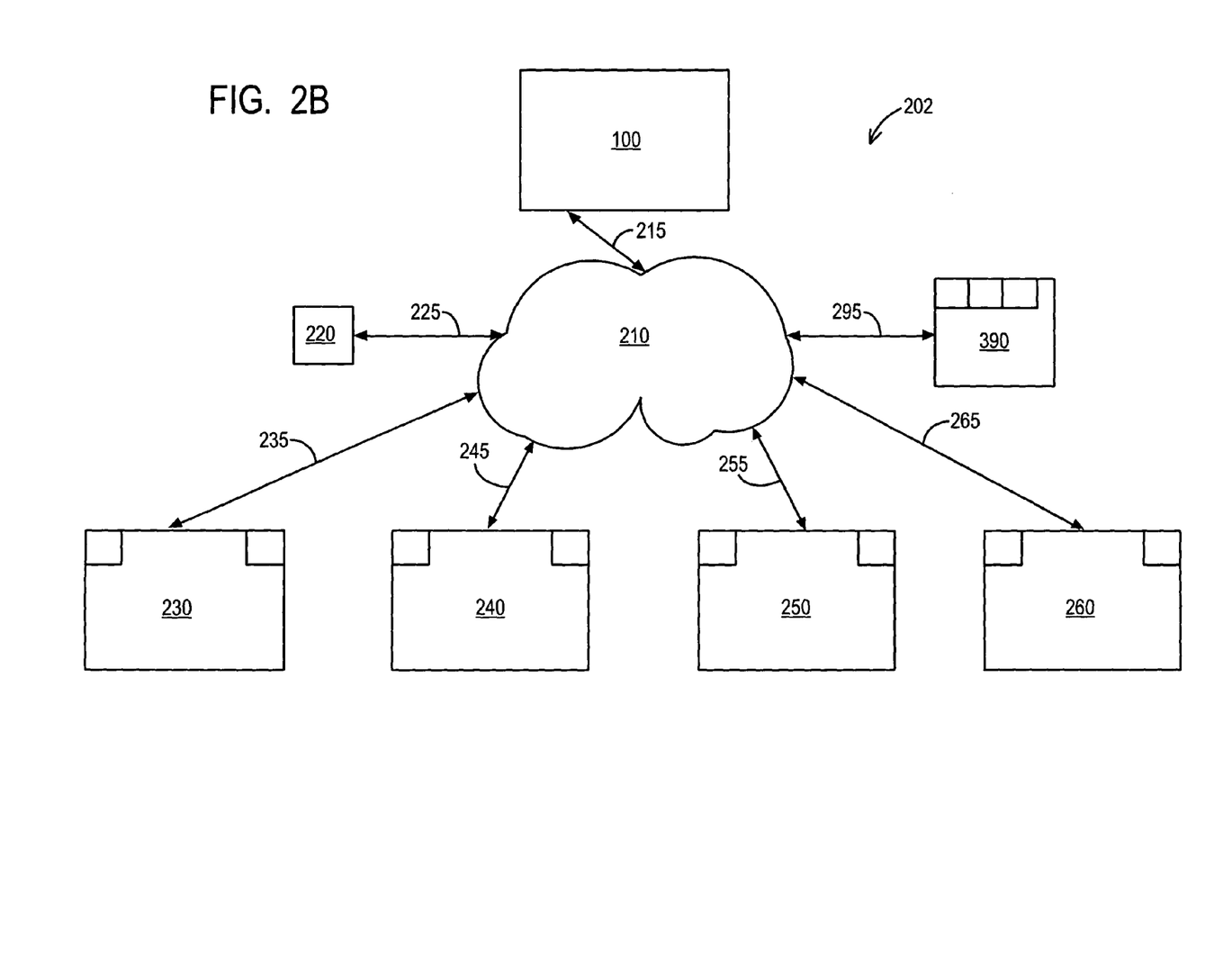
FIG. 2B is a block diagram of a second embodiment of Applicants' data processing system.

FIG. 2B shows another embodiment of Applicants' data processing system wherein host computer 390 is capable of communicating with SAN 210 via communication link 295. In this embodiment, host computer 390 communicates with information storage and retrieval system 100 via communication link 295, SAN 210, and communication link 215.

In certain embodiments, communications link 295 is selected from the group which includes a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In certain embodiments, communication link 295 is compliant with one or more of the embodiments of IEEE Specification 802.11 (collectively the "IEEE Specification"). As those skilled in the art will appreciate, the IEEE Specification comprises a family of specifications developed by the IEEE for wireless LAN technology.

Applicants' invention includes a method to selectively provide information received by information storage and retrieval system 100 from host computer 390 to one or more computing devices, such as computing devices 230 (FIGS. 2A, 2B), 240 (FIGS. 2A, 2B), 250 (FIGS. 2A, 2B), and/or 260 (FIGS. 2A, 2B).

In step 310, Applicants' method provides first information to Applicants' information storage and retrieval system, such as information storage and retrieval system 100 (FIGS. 1, 2A, 2B). In certain embodiments, the first information comprises all or portions of one or more database files, such as for example database 396 (FIG. 2A). In certain embodiments, database 396 comprises a zOS DB2 database.

In certain embodiments, Applicants' first information comprises one or more log files, wherein those one or more log files comprise information relating to one or more database files. In certain embodiments, Applicants' first information comprises one or more log files, wherein those one or more log file comprise information relating to one or more database files. In certain embodiments, Applicants' first information comprises updates for one or more log files.

In certain embodiments, the first information of step 310 is provided by a host computer, such as host computer 390 (FIGS. 2A, 2B). In certain embodiments, the first information of step 310 is created by a host computer, such as host computer 390 (FIGS. 1, 2A, 2B).

Figure 3A:
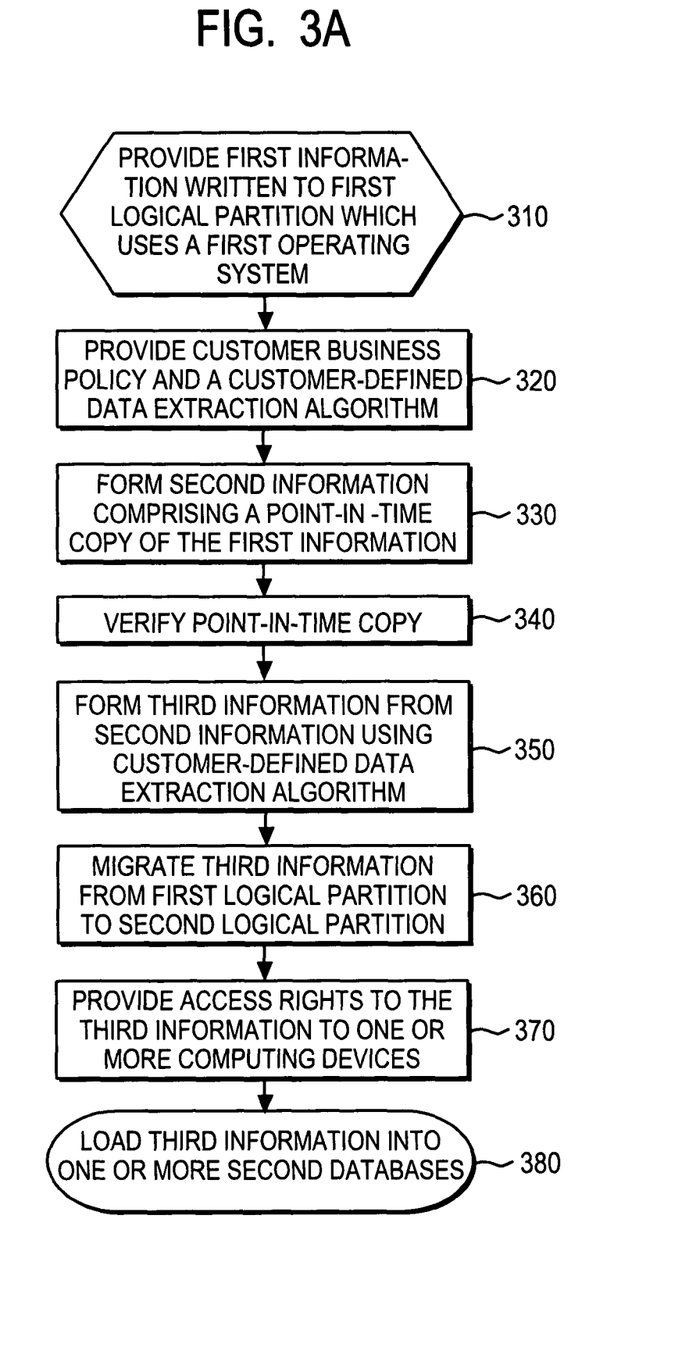
FIG. 3A is a flow chart summarizing the steps of a first embodiment of Applicants' method.

In step 320, Applicant's method provides a customer business policy and a customer-defined data extraction algorithm. In certain embodiments, the customer business policy specifies the time interval after which refreshed data is made available to different departments, and/or different divisions, and/or different business partners, and/or different clients. In certain embodiments, the customer business policy specifies one or more algorithms to verify copies of the original database. In certain embodiments, the customer business policy specifies saving earlier database copies for later use in reconstructing a corrupted database.

In step 330, Applicants' method, based upon the customer business policy of step 320, creates second information which comprises a point-in-time copy, i.e. a $T_0$ copy, of the first information. In certain embodiments, step 330 is performed by a processor, such as processor 132 (FIG. 1) or processor 142 (FIG. 1), disposed in Applicants' information storage and retrieval system, such as system 100 (FIGS. 1, 2A, 2B).

In certain embodiments, step 330 includes using a Flash-Copy copy protocol. A publication entitled IBM TotalStorage Enterprise Storage Server Implementing ESS Copy Services with IBM eServer zSeries (hereinafter the "Red Book"), September 2003, describes various copy services including FlashCopy. Chapters 6 and 7 of the Red Book are hereby incorporated by reference in their entirety herein.

Applicants' FlashCopy copy service provides a point-in-time copy of all or a portion of a logical volume, sometimes referred to as a $T_0$ copy, with almost instant availability of both the source and target volumes. As soon as a FlashCopy establish command relationship is issued, Applicants' information storage and retrieval system, such as information storage and retrieval system 100, establishes a FlashCopy relationship between a target volume and a source volume. During this establish of the FlashCopy relationship, a metadata structure is created for the relationship. This metadata is used by Applicants' information storage and retrieval system to map source and target volumes as they were at the $T_o$ time, as well as to manage subsequent reads and updates to the source and target volumes. The establish process takes a minimum amount of time. As soon as the relationship is established, user programs, such as user program 394, that have access rights to the source and target volumes have access to both the source and target copies of the data.

In certain embodiments, the FlashCopy procedure of step 330 further includes a subsequent background copy operation wherein destaging algorithms manage the copy process. Applicants' information storage and retrieval system, using the metadata structure created during the establish, keeps track of which data has been copied from the source logical volume to the target logical volume, and manages the integrity of both copies.

In certain embodiments, a FlashCopy session exists from the time the FlashCopy relationship is established until all the designated data has been copied from the source volume to the target volume. In other embodiments, the FlashCopy service relationship exists until expressly terminated.

In step 340, Applicants' method, based upon the customer business policy of step 320, verifies the second information created in step 320. In certain embodiments, step 340 is performed by a processor, such as processor 132 (FIG. 1) or processor 142 (FIG. 2), disposed in Applicants' information storage and retrieval system, such as system 100 (FIGS. 1, 2A, 2B).

In certain embodiments, step 340 includes using a DB2 Health Check algorithm to verify the second information. In certain embodiments, step 340 includes performing a cyclic redundancy check ("CRC") of the second information. In certain embodiments, step 340 includes performing a longitudinal redundancy check ("LRC") of the second information. In certain embodiments, step 340 includes using one or more customer-provided verification algorithms. In certain embodiments, step 340 includes running a virus check of the second information.

In step 350, Applicants' method forms third information using the customer-provided data extraction algorithm of step 320, wherein the third information comprises a subset of the second information. In certain embodiments, step 340 is performed by a processor, such as processor 132 (FIG. 1) or processor 142 (FIG. 2), disposed in Applicants' information storage and retrieval system, such as system 100 (FIGS. 1, 2A, 2B).

In step 360, Applicants' method migrates the third information formed in step 350 from a first logical partition in Applicants' information storage and retrieval system to a second logical partition in that system, wherein one or more interconnected computing devices, such as for example computing devices 230 (FIGS. 2A, 2B), 240 (FIGS. 2A, 2B), 250 (FIGS. 2A, 2B), and/or 260 (FIGS. 2A, 2B), have access rights to the second logical partition but not to the first logical partition.

Prior art methods to migrate information from a first logical partition to a second logical partition utilize a transport mechanism such as, for example, a Tape Transfer Protocol and/or File Transfer Protocols ("FTPs"), in combination with a physical local area network ("LAN") or a telephone connection. Use of such prior art methods requires tracking multiple tapes or FTPs associated with one or more data extraction schemes for multiple data streams from the same of different point-in-time copies.

In contrast, Applicant's method migrates information from different logical partitions disposed in the same physical enclosure. In certain embodiments, step 360 comprises establishing a virtual LAN interconnecting the first logical partition and a second logical partition. The third information is then physically copied using that virtual LAN. In certain of these embodiments, step 360 includes using a zOS to zLinux Virtual LAN protocol to transport the third information from a zOS logical partition to a zLinux logical partition. In other embodiments, step 360 includes establishing pointers in a second logical partition which point to the third information disposed in the first logical partition.

Figure 5A:
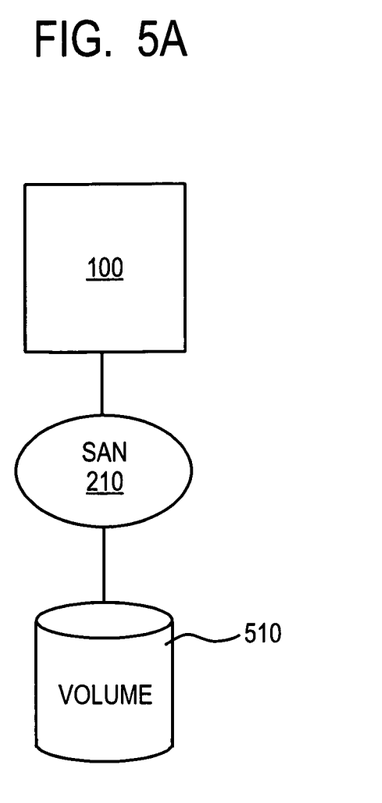
FIG. 5A is a block diagram showing a source volume attached to Applicants' storage attached network.
Figure 5B:
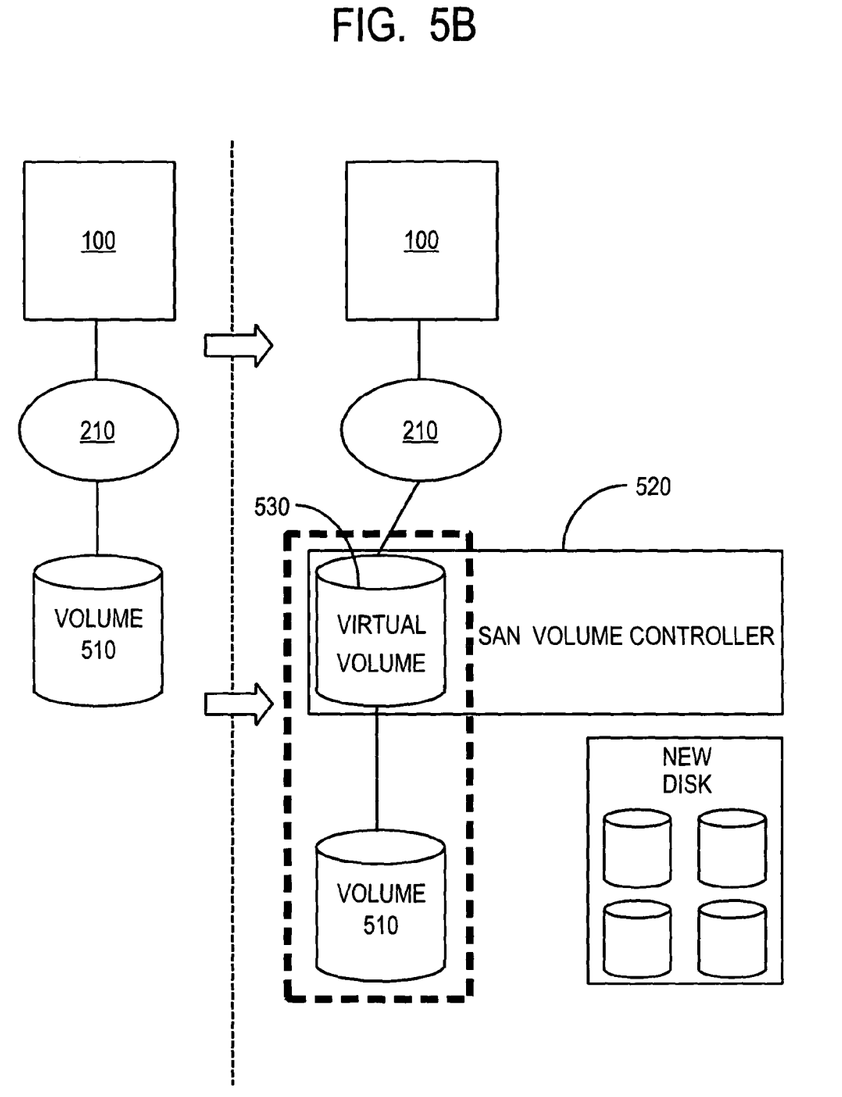
FIG. 5B is a block diagram showing migration of the source volume of FIG. 5A to a virtual volume.
Figure 5C:
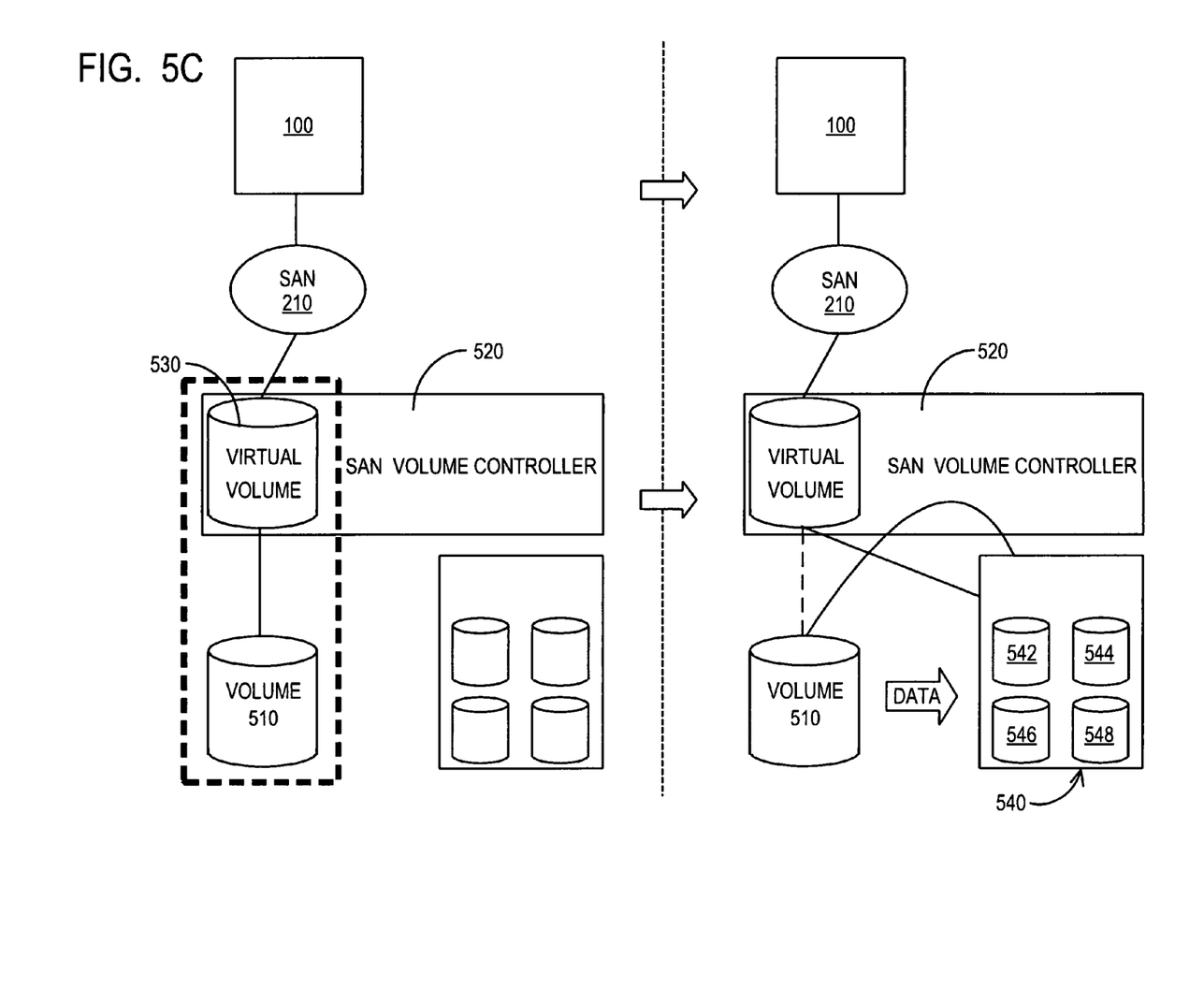
FIG. 5C is a block diagram showing migration of the virtual volume of FIG. 5B to one or more target volumes.

In certain embodiments, step 360 includes mapping the third information from a source volume in a first logical partition to a target volume in a second logical partition. Referring now to FIG. 5A, in certain embodiments step 360 includes configuring a SAN attached source volume comprising the third information, such as source volume 510. Referring now to FIG. 5B, a SAN Volume Controller 520 is installed, a virtual volume 530 created, and the source volume 510 comprising the third information is mapped to virtual volume 530. Referring now to FIG. 5C, the third information is migrated to one or more target volumes 540 in a second logical partition. Using a SAN Volume Controller allows the customer to attach existing disks to the second logical partition and then perform non-disruptive disk consolidations.

In step 370, Applicants' method provides access rights to the third information written to the one or more target volumes, such as target volumes 540 (FIG. 5C) to one or more computing devices, such as for example computing devices 230, 240, 250, and/or 260, interconnected to the SAN, such as SAN 210.

In step 380, Applicants' method loads the third information into one or more second databases, such as for example one or more of databases 236 (FIG. 2A), 246 (FIG. 2A), 256 (FIG. 2A), and/or 266 (FIG. 2A).

Figure 3B:
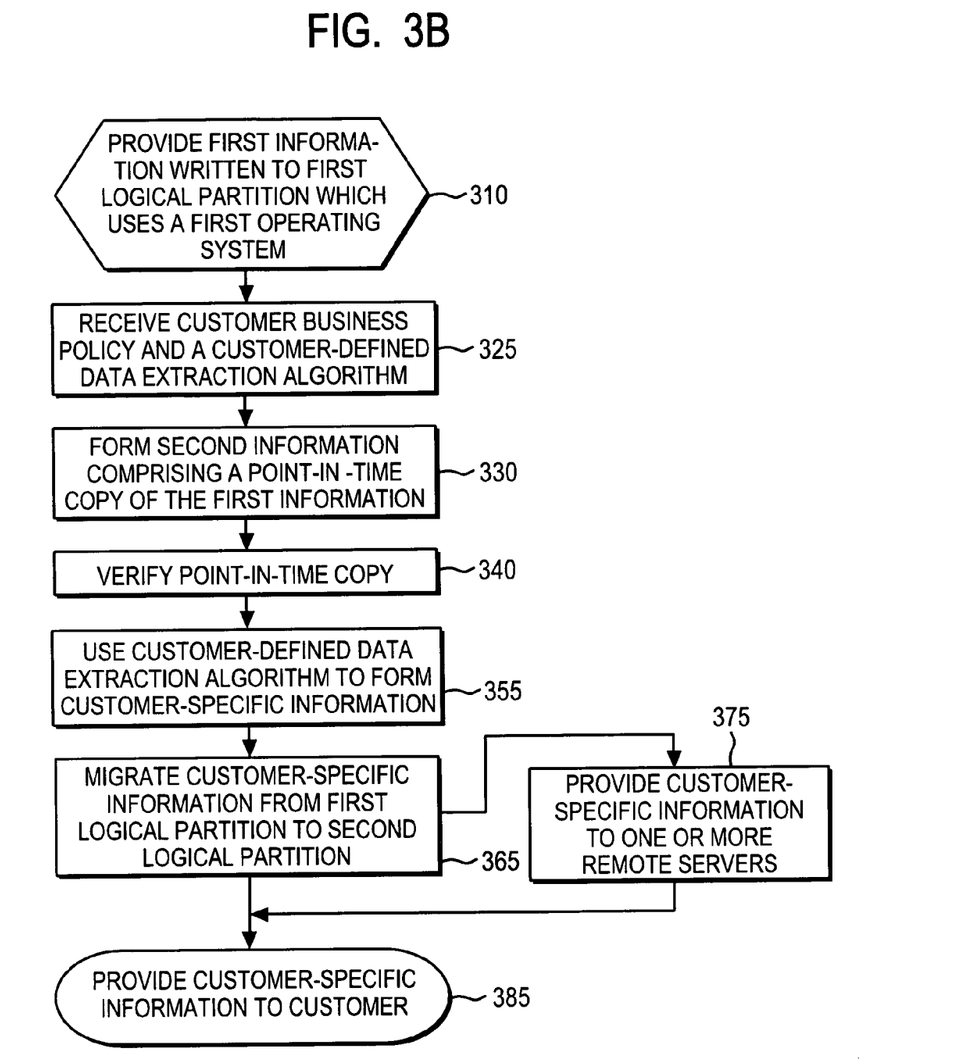
FIG. 3B is a flow chart summarizing the steps of a second embodiment of Applicants' method.

FIG. 3B recites the steps of an embodiment of Applicant's method as that method is implemented by a storage services provider. Referring now to FIGS. 3A and 3B, steps 310 recited in FIG. 3B parallels step 310 recited in FIG. 3A, and described above. In step 325, the storage services provider receives from a customer that customer's business policy and customer-defined data extraction algorithm. In certain embodiments, step 325 includes receiving the customer's business policy and customer-defined data extraction algorithm on-line. In certain embodiments, step 325 includes receiving an information storage medium comprising the customer's business policy and customer-defined data extraction algorithm, where that information storage medium may comprise a magnetic medium, an optical medium, and/or an electronic storage medium.

Step 325 is performed by a customer of the storage services provider. In certain embodiments, the customer business policy and the customer-defined data extraction algorithm of step 325 are formed by the customer with the assistance of the storage services provider. In other embodiments, the customer business policy and the customer-defined data extraction algorithm of step 325 are formed by the storage services provider using input from the customer.

Steps 330 and 340 recited in FIG. 3B parallel steps 330 and 340 recited in FIG. 3A, and described above. In step 355, the storage services provider utilizes the first information of step 310, the customer-defined data extraction algorithm of step 325, and the customer business policy of step 325, to form customer-specific information.

In step 365, the storage services provider migrates the customer-specific information of step 355 from a first logical partition to a second logical partition using the method of step 360 described above. In step 385, the storage services provider provides the customer-specific information to one or more customers. In certain embodiments, step 385 includes granting access rights to the second logical partition of step 365. In certain embodiments, this embodiment of Applicant's method includes step 375 wherein the storage services provider provides the customer-specific information of step 365 to one or more remote servers, such as for example computing devices 230 (FIGS. 2A, 2B), 240 (FIGS. 2A, 2B), 250 (FIGS. 2A, 2B), and/or 260 (FIGS. 2A, 2B).

Figure 4A:
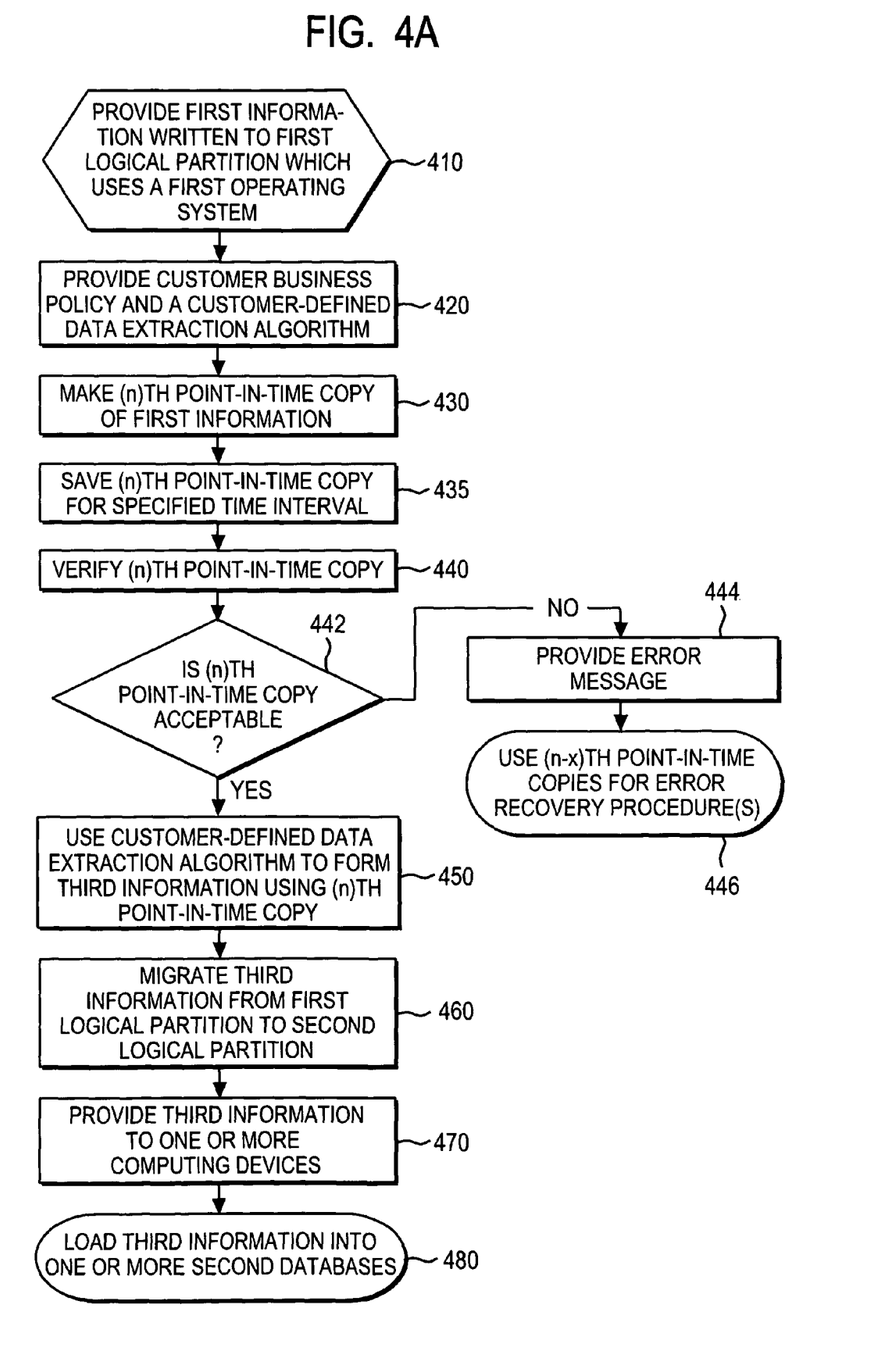
FIG. 4A is a flow chart summarizing the steps of a third embodiment of Applicants' method.

FIG. 4A recites the steps in another embodiment of Applicant's method. Referring now to FIG. 4A, steps 410 and 420 parallel steps 310 and 320 recited in FIGS. 3A and 3B, and described above.

In step 430, Applicant's method, using the customer business policy of step 420, forms the (n)th point-in-time copy of the first information of step 410. The timing of steps 410 and 420 is determined by the customer business policy. In certain embodiments, steps 410 and 420 are performed daily. In other embodiments, steps 410 and 420 are performed hourly. In other embodiments, steps 410 and 420 are performed upon receiving a command to implement the method of FIG. 4A from one or more host computers. The (n)th point-in-time copy of step 430 comprises second information.

In step 435, Applicant's method saves the (n)th point-in-time copy of step 430. In certain embodiments, step 435 includes saving the (n)th point-in-time copy of step 430 for a specified time interval. In certain embodiments, that time interval is specified by the customer business policy of step 420. In other embodiments, that specified time interval is specified in a command received from one or more host computers.

Step 440 parallels step 340 recited in FIGS. 3A and 3B, and described above. This embodiment of Applicant's method transitions from step 440 to step 442 wherein the method determines if the (n)th point-in-time copy could be verified in step 440. In certain embodiments, step 442 is performed by a processor disposed in Applicant's information storage and retrieval system, such as processor 130 (FIG. 1) and/or processor 140 (FIG. 1) disposed in system 100 (FIG. 1). In certain embodiments, step 442 is performed by a host computer, such as host computer 390 (FIGS. 2A, 2B). In certain embodiments, step 442 is performed by one or more natural persons.

In embodiments wherein step 440 includes using a DB2 Health Check algorithm, step 442 includes determining if the results of that DB2 Health Check are acceptable. In embodiments wherein step 440 includes using a CRC algorithm, step 442 includes determining if the results of that CRC are acceptable. In embodiments wherein step 440 includes using an LRC algorithm, step 442 includes determining if the results of that LRC are acceptable. In embodiments wherein step 440 includes performing a virus scan, step 442 includes determining if the results of virus scan are acceptable.

If Applicant's method determines in step 442 that the (n)th point-in-time copy could be verified in step 440, then the method transitions from step 442 to steps 450, 460, 470, and 480. Step 450 parallels step 350 recited in FIG. 3A and described above. Step 460 parallels step 360 recited in FIG. 3A and described above. Step 470 parallels step 370 recited in FIG. 3A and described above. Step 480 parallels step 380 recited in FIG. 3A and described above.

If Applicant's method determines in step 442 that the (n)th point-in-time copy could not be verified in step 440, then the method transitions from step 442 to step 444 wherein the method provides an error message. In certain embodiments, step 444 is performed by a processor disposed in Applicant's information storage and retrieval system, such as processor 130 (FIG. 1) and/or processor 140 (FIG. 1) disposed in system 100 (FIG. 1).

Applicant's method transitions from step 444 to step 446 wherein the method uses the saved previous point-in-time copies, i.e. the (n-x) point-in-time copies, wherein x is greater than or equal to 1 and less than or equal to about 10, in certain error recovery procedures ("ERPs"). In certain embodiments, those ERPs include defining a recovery point from which a log apply recovery can be performed.

Figure 4B:
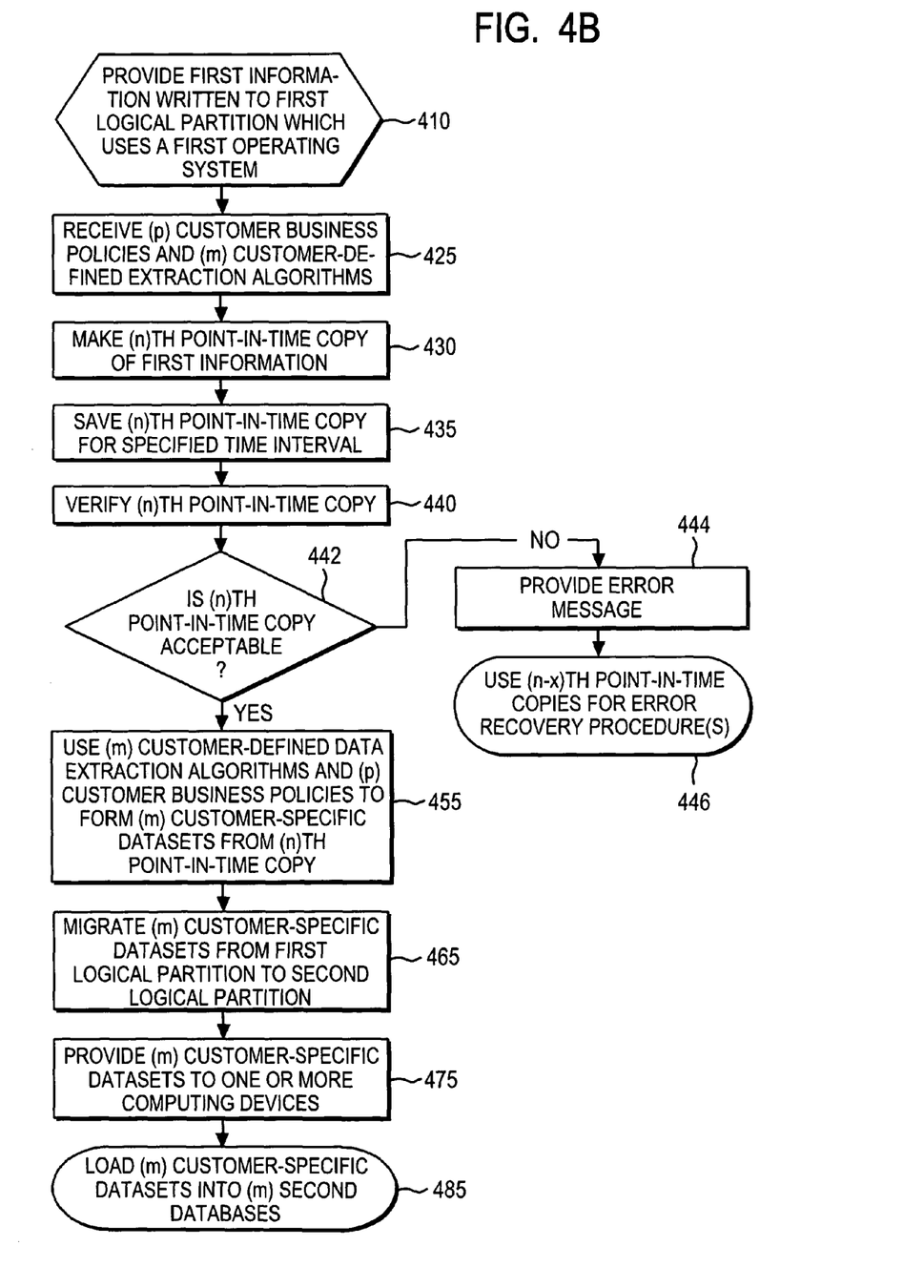
FIG. 4B is a flow chart summarizing the steps of a fourth embodiment of Applicants' method.

FIG. 4B recites an embodiment of Applicant's method implementing the steps of FIG. 4A by a storage services provider. FIG. 4B is directed to providing (m) customer-specific datasets using first information, (p) business policies, and (m) customer-defined data extraction algorithms, provided by a first customer. The steps of FIG. 4B may be separately implemented for each of (N) customers of the storage services provider.

Referring now to FIG. 4B, step 410 parallels step 310 recited in FIGS. 3A and 3B, and described above. In step 425, the storage services provider receives from a first customer (p) business policies and (m) customer-defined data extraction algorithms, wherein (p) is less than or equal to (m). In certain embodiments, step 425 includes receiving on-line from a first customer (p) business policies and (m) customer-defined data extraction algorithms. In certain embodiments, step 425 includes receiving an information storage medium comprising a first customer's (p) business policies and (m) customer-defined data extraction algorithm, where that information storage medium may comprise a magnetic medium, an optical medium, and/or an electronic storage medium.

In certain embodiments, the first customer provides one business policy that applies to the formation of all (m) customer-specific datasets formed using the (m) customer-defined data extraction algorithms. In other embodiments, the first customer provides (m) business policies, wherein each of those (m) business policies, for example, specifies a different timing to form the (n)th point-in-time copy of the first information, and/or differing timing to form a customer-specific dataset from that (n)th point-in-time copy.

Steps 430, 435, 440, 442, 444, and 446, recited in FIG. 4B parallel those steps as recited in FIG. 4A and described above. In step 455, the storage services provider, using the (m) customer-defined data extraction algorithms and the (p) customer business policies, forms (m) customer-specific datasets from the (n)th point-in-time copy, i.e. the second information of step 430. In certain embodiments, step 455 is performed by a processor disposed in Applicant's information storage and retrieval system, such as processor 130 (FIG. 1) and/or processor 140 (FIG. 1) disposed in system 100 (FIG. 1).

In step 465, the storage services provider migrates (m) customer-specific datasets from a first logical partition to a second logical partition using, for the formation of each of the (m) datasets, the embodiments described for step 360 (FIG. 3A) above.

In step 475, the storage services provider provides the (m) migrated customer-specific datasets of step 465 to one or more computing devices, such as for example computing devices 230 (FIGS. 2A, 2B), 240 (FIGS. 2A, 2B), 250 (FIGS. 2A, 2B), and/or 260 (FIGS. 2A, 2B). In certain embodiments, step 475 includes granting access rights to the (m) migrated customer-specific datasets.

In step 485, Applicant's method loads the (m) customer-specific datasets into (m) second databases. In certain embodiments, step 485 includes loading one or more of the (m) customer-specific datasets into one or more second databases by one or more individual customers of the storage services provider. In certain embodiments, the storage services provided in step 485 loads one or more of the (m) customer-specific datasets into one or more second databases specified by one or more individual customers of the storage services provider.

The embodiments of Applicants' method recited in FIGS. 3A, 3B, 4A, and/or 4B, may be implemented separately. Moreover, in certain embodiments, individual steps recited in FIGS. 3A, 3B, 4A, and/or 4B, may be combined, eliminated, or reordered.

In certain embodiments, Applicants' invention includes instructions residing in memory 133 (FIG. 1), or in memory 143 (FIG. 1), where those instructions are executed by processor 132 (FIG. 1), and/or processor 142 (FIG. 1), respectively, to performs steps 310, 320, 330, 340, 350, 360, 370, and/or 380, recited in FIG. 3A, and/or steps 310, 325, 330, 340, 355, 365, 375, and/or 385, recited in FIG. 3B, and/or steps 410, 420, 430, 435, 440, 442, 444, 446, 450, 460, 470, and/or 480, recited in FIG. 4A, and/or steps 410, 425, 430, 435, 440, 442, 444, 446, 455, 465, 475, and/or 485, recited in FIG. 4B.

In other embodiments, Applicants' invention includes instructions residing in any other computer program product, where those instructions are executed by a computer external to, or internal to, system 100, to perform steps 310, 320, 330, 340, 350, 360, 370, and/or 380, recited in FIG. 3A, and/or steps 310, 325, 330, 340, 355, 365, 375, and/or 385, recited in FIG. 3B, and/or steps 410, 420, 430, 435, 440, 442, 444, 446, 450, 460, 470, and/or 480, recited in FIG. 4A, and/or steps 410, 425, 430, 435, 440, 442, 444, 446, 455, 465, 475, and/or 485, recited in FIG. 4B. In either case, the instructions may be encoded in an information storage medium comprising, for example, a magnetic information storage medium, an optical information storage medium, an electronic information storage medium, and the like. By "electronic storage medium," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method to selectively provide information to one or more computing devices, comprising the steps of:
    providing an information storage and retrieval system comprising first information, a first logical partition, and a second logical partition, wherein said first information is disposed in said first logical partition;
    receiving by said information storage and retrieval system from a first customer a customer business policy specifying a time interval after which data is made available to business partners;
    receiving by said information storage and retrieval system from said first customer a plurality of customer-defined data extraction algorithms;
    based upon said customer business policy, forming by said processor second information comprising an instantaneous point-in-time copy of said first information;
    forming by said processor a plurality of customer-specific datasets from said second information using said plurality of customer-defined data extraction algorithms;
    migrating by said processor said plurality of customer-specific datasets from said first logical partition to said second logical partition, wherein one or more computing devices have access rights to said second logical partition but not to said first logical partition.

2. The method of claim 1, further comprising the steps of:
    providing a data verification algorithm; and
    verifying said second information using said data verification algorithm prior to forming said plurality of customer-specific datasets.

3. The method of claim 2, wherein said verifying step further comprises performing a CRC check of said second information.

4. The method of claim 2, wherein said verifying step further comprises performing an LRC check of said second information.

5. The method of claim 2, wherein said verifying step further comprises performing a virus scan of said second information.

6. The step of claim 2, wherein said providing an information storage and retrieval system step further comprises providing first information comprising a database; and
    wherein said providing a data verification algorithm further comprises providing a health check algorithm.

7. The method of claim 1, wherein said migrating step further comprises the steps of:
    providing a storage attached network ("SAN") comprising a SAN Volume Controller, wherein said SAN is capable of communicating with said information storage and retrieval system and with said one or more computing devices;
    creating a virtual volume attached to said SAN;
    mapping said plurality of customer-specific datasets from said first logical partition to said virtual volume;
    migrating said plurality of customer-specific datasets from said virtual volume to one or more target volumes disposed in said one or more computing devices.

8. The method of claim 7, further comprising the steps of:
    virtually attaching one or more existing disks comprising customer data to said second logical partition;
    performing disk consolidations by said SAN Volume Controller using said one or more existing disks.

9. The method of claim 1, wherein said migrating step further comprises:
    providing a virtual local area network interconnecting said first logical partition and said second logical partition;
    copying said plurality of customer-specific datasets from said first logical partition to said second logical partition using said virtual local area network.

10. The method of claim 1, wherein said forming second information step further comprises:
    establishing a relationship between a source volume comprising said first information and a target volume; and
    mapping said source volume to said target volume.

11. The method of claim 1, wherein said forming second information step further comprises forming and saving a (n)th instantaneous point-in-time copy of said first information at time $T_0$, further comprising the steps of:
    forming and saving a previous (n-x)th point-in-time instantaneous copies of said first information, wherein n is greater than x, and wherein x is greater than or equal to 1 and less than or equal to about 3;
    verifying said (n)th point-in-time copy;
    operative if said (n)th point-in-time copy cannot be verified, using said (n-x) point-in-time copies to perform error recovery procedures.

12. An information storage and retrieval system comprising first information and an information storage medium having computer readable program code disposed therein to selectively provide one or more subsets of that first information to one or more computing devices, the computer readable program code comprising a series of computer readable program steps to effect:

receiving from a first customer a customer business policy;

based upon said customer business policy, forming second information comprising an instantaneous point-in-time copy of said first information;

receiving from said first customer a plurality of customer-defined data extraction algorithms;

forming a plurality of customer-specific datasets from said second information using said plurality of customer-defined data extraction algorithms;

migrating said plurality of customer-specific datasets from said first logical partition to said second logical partition, wherein one or more computing devices have access rights to said second logical partition but not to said first logical partition.

13. The information storage and retrieval system of claim 12, wherein said information storage and retrieval system is capable of communicating with a storage attached network ("SAN") comprising a SAN Volume Controller, wherein said SAN is capable of communicating with said one or more computing devices, said computer readable program code to migrate third information further comprising a series of computer readable program steps to effect:

creating a virtual volume;

mapping said plurality of customer-specific datasets from said first logical partition to said virtual volume;

migrating said plurality of customer-specific datasets from said virtual volume to one or more target volumes disposed in said one or more computing devices.

14. The information storage and retrieval system of claim 13, said computer readable program code further comprising a series of computer readable program steps to effect:

virtually attaching to said SAN one or more existing disks comprising customer data;

performing disk consolidations by said SAN Volume Controller using said one or more existing disks.

15. The information storage and retrieval system of claim 12, wherein said computer readable program code to migrating third information further comprises a series of computer readable program steps to effect:

establishing a virtual local area network interconnecting said first logical partition and said second logical partition;

copying said plurality of customer-specific datasets from said first logical partition to said second logical partition using said virtual local area network.

16. The information storage and retrieval system of claim 12, said computer readable program code further comprising a series of computer readable program steps to effect:

retrieving a previously-provided data verification algorithm; and     verifying said second information using said data verification algorithm prior to forming said plurality of customer-specific datasets.

17. The information storage and retrieval system of claim 16, said computer readable program code to verify said second information further comprising a series of computer readable program steps to effect performing an LRC check of said second information.

18. The information storage and retrieval system of claim 16, said computer readable program code to verify said second information further comprising a series of computer readable program steps to effect performing a CRC check of said second information.

19. The information storage and retrieval system of claim 16, said computer readable program code to verify said second information further comprising a series of computer readable program steps to effect performing a virus scan of said second information.

20. The information storage and retrieval system of claim 16, said computer readable program code further comprising a series of computer readable program steps to effect:

receiving first information comprising a database; and retrieving a health check algorithm;

verifying said second information using health check algorithm.

21. The information storage and retrieval system of claim 12, said computer readable program code to form second information further comprising a series of computer readable program steps to effect:

establishing a relationship between a source volume comprising said first information and a target volume; and     mapping said source volume to said target volume.

22. The information storage and retrieval system of claim 12, said computer readable program code further comprising a series of computer readable program steps to effect:

forming and saving a (n)th instantaneous point-in-time copy of said first information;

forming and saving a previous (n-x)th instantaneous point in time copies of said first information, wherein x is between 1 and about 3;

verifying said (n)th point-in-time copy;

operative if said (n)th point-in-time copy cannot be verified, using said (n-x) point-in-time copies to perform error recovery procedures.

23. A computer program product encoded in an information storage medium and usable with a programmable computer processor to selectively provide one or more subsets of first information from an information storage and retrieval system comprising first information to one or more computing devices, comprising:

computer readable program code which causes said programmable computer processor to receive from a first customer a customer business policy specifying a time interval after which data is made available to business partners;

computer readable program code which, based upon said customer business policy, causes said programmable computer processor to form second information comprising an instantaneous point-in-time copy of said first information;

computer readable program code which causes said programmable computer processor to receive from said first customer a plurality of customer-defined data extraction algorithms;

computer readable program code which causes said programmable computer processor to form a plurality of customer-specific datasets from said second information using said plurality of customer-defined data extraction algorithms;

computer readable program code which causes said programmable computer processor to migrate said plurality of customer-specific datasets from said first logical partition to said second logical partition, wherein one or more computing devices have access rights to said second logical partition but not to said first logical partition.

24. The computer program product of claim 23, wherein said information storage and retrieval system is capable of communicating with a storage attached network ("SAN")

comprising a SAN Volume Controller, wherein said SAN is capable of communicating with said one or more computing devices, further comprising:

computer readable program code which causes said programmable computer processor to create a virtual volume;

computer readable program code which causes said programmable computer processor to map said plurality of customer-specific datasets from said first logical partition to said virtual volume;

computer readable program code which causes said programmable computer processor to migrate said plurality of customer-specific datasets from said virtual volume to one or more target volumes disposed in said one or more computing devices.

25. The computer program product of claim 23 further comprising:

computer readable program code which causes said programmable computer processor to retrieve a previously-provided data verification algorithm; and     computer readable program code which causes said programmable computer processor to verify said second information using said data verification algorithm prior to forming said plurality of customer-specific datasets.

26. The computer program product of claim 25, wherein said computer readable code to verify said second information further comprises computer readable program code which causes said programmable computer processor to perform an LRC check of said second information.

27. The computer program product of claim 25, wherein said computer readable code to verify said second information further comprises computer readable program code which causes said programmable computer processor to perform a CRC check of said second information.

28. The computer program product of claim 25, wherein said computer readable code to verify said second information further comprises computer readable program code which causes said programmable computer processor to perform a virus scan of said second information.

29. The computer program product of claim 25, further comprising:

computer readable program code which causes said programmable computer processor to receive first information comprising a database; and     computer readable program code which causes said programmable computer processor to retrieve a health check algorithm;

computer readable program code which causes said programmable computer processor to verify said second information using health check algorithm.

30. The computer program product of claim 23, further comprising:

computer readable program code which causes said programmable computer processor to establish a relationship between a source volume comprising said first information and a target volume; and     computer readable program code which causes said programmable computer processor to map said source volume to said target volume.

31. The computer program product of claim 23, further comprising:

computer readable program code which causes said programmable computer processor to form and save a (n)th instantaneous point-in-time copy of said first information;

computer readable program code which causes said programmable computer processor to form and save a previous (n-x)th instantaneous point in time copies of said first information, wherein x is between 1 and about 3;

computer readable program code which causes said programmable computer processor to verify said (n)th point-in-time copy;

computer readable program code which, if said (n)th point-in-time copy cannot be verified, causes said programmable computer processor to use said (n-x) point-in-time copies to perform error recovery procedures.

\* \* \* \* \*